(12) United States Patent
Taira et al.

(10) Patent No.: US 10,669,411 B2
(45) Date of Patent: *Jun. 2, 2020

(54) FLAME-RETARDANT RESIN COMPOSITION AND METAL CABLE, OPTICAL FIBER CABLE, AND MOLDED ARTICLE USING THE SAME

(71) Applicant: FUJIKURA LTD., Tokyo (JP)

(72) Inventors: Seiichi Taira, Chiba (JP); Haruka Kohri, Chiba (JP); Shoichiro Nakamura, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/060,325

(22) PCT Filed: Nov. 22, 2016

(86) PCT No.: PCT/JP2016/084641
§ 371 (c)(1),
(2) Date: Jun. 7, 2018

(87) PCT Pub. No.: WO2017/104362
PCT Pub. Date: Jun. 22, 2017

(65) Prior Publication Data
US 2018/0362744 A1 Dec. 20, 2018

(30) Foreign Application Priority Data
Dec. 14, 2015 (JP) .................................. 2015-243154

(51) Int. Cl.
*C08L 23/00* (2006.01)
*H01B 3/00* (2006.01)
(Continued)

(52) U.S. Cl.
CPC .............. *C08L 23/06* (2013.01); *C08F 10/02* (2013.01); *C08K 3/22* (2013.01); *C08K 5/098* (2013.01);
(Continued)

(58) Field of Classification Search
CPC ........... H01B 3/004; H01B 3/30; C08L 23/06; C08L 23/0869; C08K 3/016; C08K 3/10; C08K 5/0066
See application file for complete search history.

(56) References Cited

U.S. PATENT DOCUMENTS 5,317,051 A * 5/1994 Harashige ................ C08K 3/22
524/310
5,889,087 A 3/1999 Hayashi et al.
(Continued)

FOREIGN PATENT DOCUMENTS

CN 101437888 A 5/2009
CN 102731891 A 10/2012
(Continued)

OTHER PUBLICATIONS

Office Action issued in corresponding Taiwanese Patent Application No. 105140897 dated Sep. 7, 2017 (3 pages), (No English language translation provided).
(Continued)

*Primary Examiner* — Mark Kopec
(74) *Attorney, Agent, or Firm* — Osha Liang LLP (57) ABSTRACT

A flame-retardant resin composition containing a base resin composed of polyethylene and an acid-modified polyolefin, aluminum hydroxide, a silicone compound, and a fatty acid-containing compound. The flame-retardant resin composition may contain polyethylene with a density of 912.4 kg/m³ or less. The base resin may contain an amount of polyethylene of the range 80 to 99% by mass, the amount of
(Continued)

the acid-modified polyolefin in the base resin is of the range 1 to 20% by mass. To 100 parts by mass of the base resin, the aluminum hydroxide may be added in an amount of the range 5 to 190 parts by mass, the silicone compound may be added in an amount of the range 1.5 to 10 parts by mass, and the fatty acid-containing compound may be added in an amount of the range 5 to 20 parts by mass.

13 Claims, 3 Drawing Sheets

(51) Int. Cl.
  *C08L 23/06* (2006.01)
  *C08K 3/22* (2006.01)
  *C08K 5/098* (2006.01)
  *C08L 83/04* (2006.01)
  *H01B 3/44* (2006.01)
  *H01B 7/295* (2006.01)
  *C08L 23/26* (2006.01)
  *H01B 7/02* (2006.01)
  *G02B 6/44* (2006.01)
  *C08F 10/02* (2006.01)

(52) U.S. Cl.
  CPC .............. *C08L 23/26* (2013.01); *C08L 83/04* (2013.01); *G02B 6/44* (2013.01); *H01B 3/00* (2013.01); *H01B 3/44* (2013.01); *H01B 7/02* (2013.01); *H01B 7/295* (2013.01); *C08K 2003/2227* (2013.01)

(56) References Cited

U.S. PATENT DOCUMENTS

| | | | |
|---|---|---|---|
| 6,429,246 B1 | 8/2002 | Rous | |
| 2002/0013395 A1* | 1/2002 | Hatanaka | C08K 3/22 524/261 |
| 2007/0262483 A1 | 11/2007 | Grasselli et al. | |
| 2012/0219812 A1* | 8/2012 | Mitsutake | C08F 138/00 428/500 |
| 2014/0141245 A1 | 5/2014 | Iwasaki et al. | |
| 2015/0093529 A1 | 4/2015 | Fujita et al. | |

FOREIGN PATENT DOCUMENTS

| | | |
|---|---|---|
| CN | 105037899 A | 11/2015 |
| CN | 104066798 A | 9/2019 |
| EP | 2899237 A1 | 7/2015 |
| JP | H10-007913 A | 1/1998 |
| JP | H10-255560 A | 9/1998 |
| JP | 2001-184946 A | 7/2001 |
| JP | 2002-241554 A | 8/2002 |
| JP | 2003-335962 A | 11/2003 |
| JP | 2006-225568 A | 8/2006 |
| JP | 2007-161787 A | 6/2007 |
| JP | 2014-101454 A | 6/2014 |
| JP | 2015-151402 A | 8/2015 |
| JP | 2015-168697 A | 9/2015 |
| JP | 2015-183157 A | 10/2015 |
| JP | 2015-201448 A | 11/2015 |
| JP | 5890077 B1 | 3/2016 |
| WO | 2015/111309 A1 | 7/2015 |

OTHER PUBLICATIONS

Extended European Search Report issued in European Application No. 16875346.5, dated Jul. 11, 2019 (6 pages).

* cited by examiner

FLAME-RETARDANT RESIN COMPOSITION AND METAL CABLE, OPTICAL FIBER CABLE, AND MOLDED ARTICLE USING THE SAME

TECHNICAL FIELD

One or more embodiments of the present invention relate to a flame-retardant resin composition and a metal cable, an optical fiber cable, and a molded article using the same.

BACKGROUND

So-called eco-materials are widely used for covering of cables, outer sheaths of cables, tubes, tapes, packaging materials, building materials and the like.

As such an eco-material, a flame-retardant resin composition in which a silicone compound and a fatty acid-containing compound as a flame retardant aid as well as aluminum hydroxide as a flame retardant are added to a polyolefin resin is known (See Patent Document 1 below).

CITATION LIST

Patent Document

Patent Document 1: JP 1998-7913 A

Flame-retardant resin compositions have been required to exhibit not only excellent flame retardancy but also excellent mechanical properties, weather resistance, and chemical resistance so as to be applicable to various applications including cables.

However, the flame-retardant resin composition described in Patent Document 1 has room for improvement from the viewpoint of simultaneously satisfying excellent flame retardancy, mechanical properties, weather resistance, and chemical resistance although it exhibits excellent flame retardancy.

Hence, a flame-retardant resin composition of suitable flame retardancy, mechanical properties, weather resistance, and chemical resistance has been desired.

SUMMARY

One or more embodiments of the present invention may provide a flame-retardant resin composition of suitable flame retardancy, mechanical properties, weather resistance, and chemical resistance, and a metal cable, an optical fiber cable and a molded article using the same.

The present inventors have found out that the properties of flame-retardant resin compositions may be altered by blending aluminum hydroxide, a silicone compound, and a fatty acid-containing compound to a base resin composed of polyethylene and an acid-modified polyolefin at predetermined proportions, respectively, setting the content rates of the polyethylene and the acid-modified polyolefin in the base resin to predetermined proportions, respectively, and further setting the density of the polyethylene in the base resin to a specific value or less.

One or more embodiments of the present invention are directed towards a flame-retardant resin composition containing a base resin composed of polyethylene and an acid-modified polyolefin, aluminum hydroxide, a silicone compound, and a fatty acid-containing compound, in which the density of the polyethylene of some embodiments is 912.4 $kg/m^3$ or less, the content rate of the polyethylene in the base resin of some embodiments is 80% by mass or more and 99% by mass or less, the content rate of the acid-modified polyolefin in the base resin of some embodiments is 1% by mass or more and 20% by mass or less, the aluminum hydroxide of some embodiments is blended at a proportion of 5 parts by mass or more and 190 parts by mass or less with respect to 100 parts by mass of the base resin, the silicone compound of some embodiments is blended at a proportion of 1.5 parts by mass or more and 10 parts by mass or less with respect to 100 parts by mass of the base resin, and the fatty acid-containing compound of some embodiments is blended at a proportion of 5 parts by mass or more and 20 parts by mass or less with respect to 100 parts by mass of the base resin.

According to the flame-retardant resin composition of one or more embodiments of the present invention, it is possible to simultaneously satisfy excellent flame retardancy, mechanical properties, weather resistance, and chemical resistance.

Incidentally, the present inventors presume the reason why the above-described effect is obtained in the flame-retardant resin composition of one or more embodiments of the present invention as follows.

In other words, aluminum hydroxide may cause heat absorption by dehydration at a relatively low temperature at the early stage of combustion of the flame-retardant resin composition when aluminum hydroxide is contained in the flame-retardant resin composition. By this, the temperature rise and ignition of the base resin in the flame-retardant resin composition may be suppressed or continuation of combustion is hindered. In addition, when aluminum hydroxide, a silicone compound, and a fatty acid-containing compound are contained in the flame-retardant resin composition, a barrier layer mainly composed of aluminum hydroxide, the silicone compound, the fatty acid-containing compound, and decomposed products thereof is formed on the surface of the base resin and combustion of the base resin is suppressed at the time of combustion of the flame-retardant resin composition. Hence, it is considered that excellent flame retardancy is secured by the synergistic effect of the two kinds of flame retardant actions of heat absorption by dehydration and formation of the barrier layer at the time of combustion. In addition, it is possible to improve the receptivity of aluminum hydroxide in polyethylene by using polyethylene having a density of 912.4 $kg/m^3$ or less as the polyethylene contained in the base resin. Hence, it is considered that excellent mechanical properties and weather resistance are secured even when the amount of aluminum hydroxide blended is increased. Furthermore, it is considered that the adhesive property of the polyethylene with aluminum hydroxide is improved and excellent chemical resistance is secured as an acid-modified polyolefin is contained in the base resin.

In one or embodiments, the density of the polyethylene may be 905.3 $kg/m^3$ or less.

In such embodiments, more excellent weather resistance may be obtained in the flame-retardant resin composition as compared to a case in which the density of polyethylene exceeds 905.3 $kg/m^3$.

In one or embodiments, the acid-modified polyolefin may be a maleic anhydride-modified polyolefin.

In this case, the mechanical properties may be improved as compared to a case in which the acid-modified polyolefin is an acid-modified polyolefin other than the maleic anhydride-modified polyolefin.

In one or embodiments, the aluminum hydroxide may be blended to the base resin at a proportion of 5 parts by mass or more and 140 parts by mass or less.

In such embodiments, more excellent flame retardancy and mechanical properties are obtained in the flame-retardant resin composition as compared to a case in which the proportion of aluminum hydroxide blended to 100 parts by mass of the base resin is out of the above range.

In one or embodiments, the silicone compound may be silicone gum.

In such embodiments, bloom is less likely to occur as compared to an embodiment in which the silicone compound is a silicone compound other than silicone gum.

In one or more embodiments, the fatty acid-containing compound may be magnesium stearate.

In such embodiments, it is possible to obtain more excellent flame retardancy by adding magnesium stearate in a smaller amount as compared to a case in which the fatty acid-containing compound is a fatty acid-containing compound other than magnesium stearate.

In one or more embodiments, the fatty acid-containing compound may be blended to the base resin at a proportion of 7 parts by mass or more and 20 parts by mass or less.

In such embodiments, more excellent flame retardancy is obtained in the flame-retardant resin composition as compared to a case in which the proportion of the fatty acid-containing compound blended to 100 parts by mass of the base resin is out of the above range.

In addition, one or more embodiments of the present invention are directed toward a metal cable including a metal conductor and an insulating body covering the metal conductor, in which the insulating body is composed of the flame-retardant resin composition described above.

Furthermore, one or more embodiments of the present invention is directed toward an optical fiber cable including an optical fiber and an insulating body covering the optical fiber, in which the insulating body is composed of the flame-retardant resin composition described above.

In addition, one or more embodiments of the present invention is directed toward a molded article including the flame-retardant resin composition described above.

According to the molded article of some embodiments of the present invention, it is possible to simultaneously satisfy excellent flame retardancy, mechanical properties, weather resistance, and chemical resistance.

Incidentally, in some embodiments of the present invention, the density in a case in which the polyethylene is composed of a mixture of plural kinds of polyethylenes having different densities refers to the value obtained by summing up the values X calculated by the following formula for the respective polyethylenes.

$$X = \text{density of polyethylene} \times \text{content rate of polyethylene in mixture (unit: \% by mass)}$$

According to one or more embodiments of the present invention, a flame-retardant resin composition which can simultaneously satisfy excellent flame retardancy, mechanical properties, weather resistance, and chemical resistance, and a metal cable, an optical fiber cable and a molded article using the same are provided.

DETAILED DESCRIPTION

Hereinbelow, the embodiments of the present invention are explained in detail by using FIG. 1 and FIG. 2.

[Cable]

Figure 1:
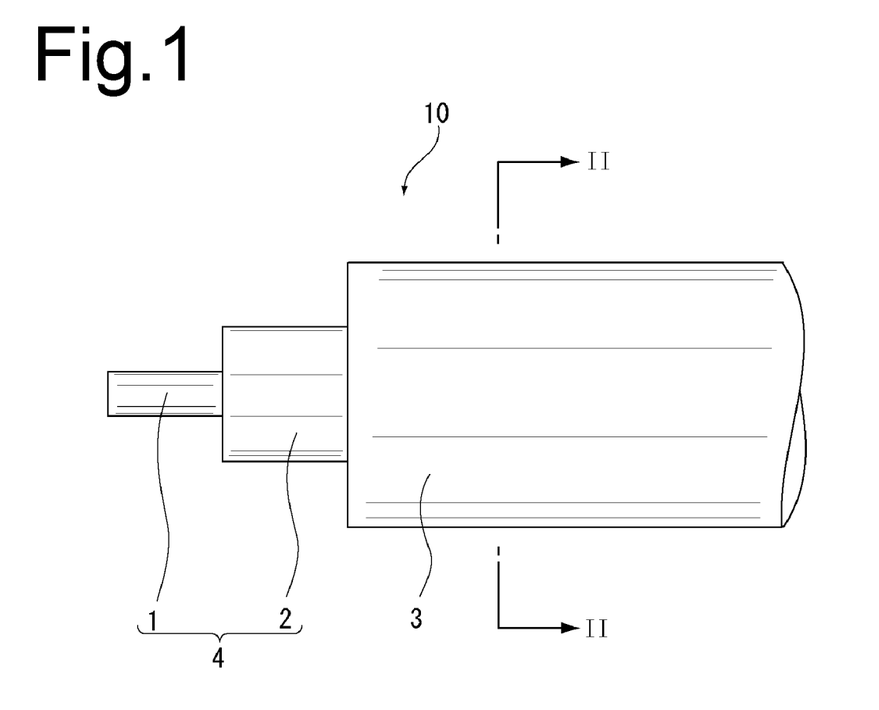
FIG. 1 is a partial side view illustrating the metal cable of one or more embodiments of the present invention.
Figure 2:
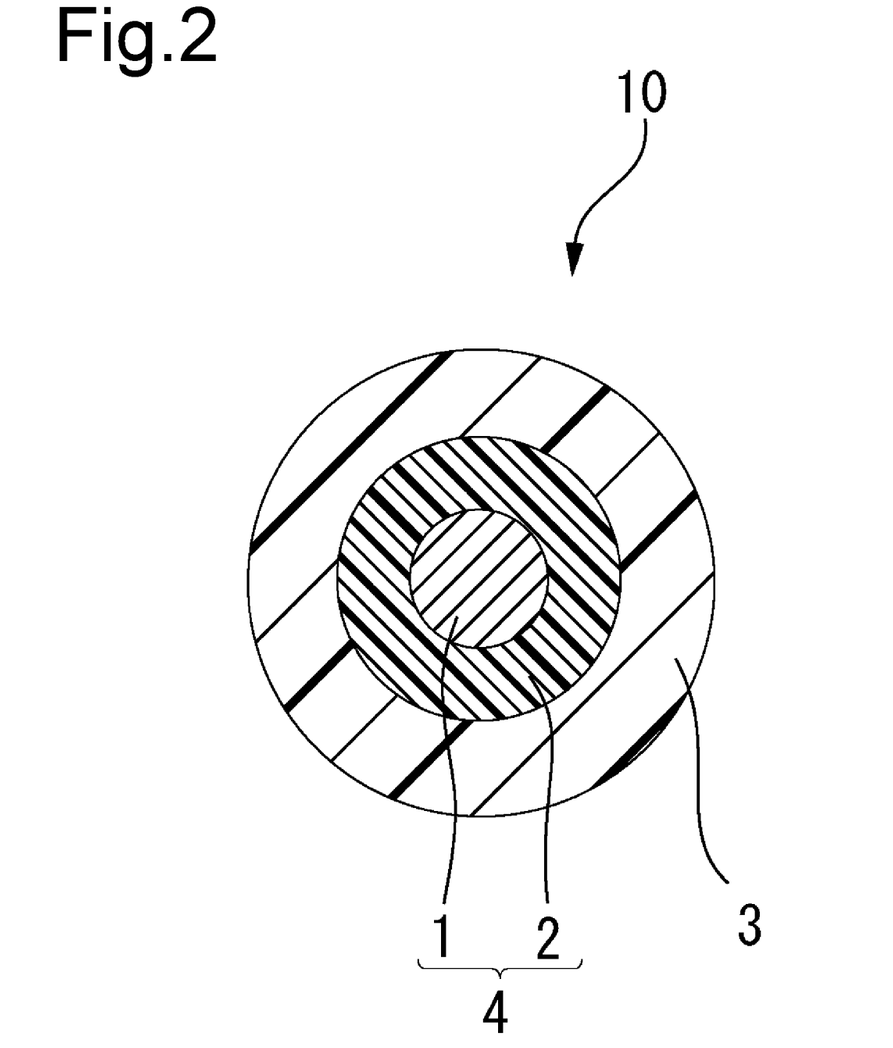
FIG. 2 is a cross-sectional view taken along the line II-II of FIG. 1.

FIG. 1 is a partial side view a metal cable of one or more embodiments of the present invention. FIG. 2 is a cross-sectional view taken along the line II-II of FIG. 1. As illustrated in FIG. 1 and FIG. 2, a round cable 10 as a metal cable is equipped with an insulating wire 4 and a tubular outer sheath 3 as an insulating body which covers the insulating wire 4. Moreover, the insulating wire 4 has an internal conductor 1 as a metal conductor and a tubular insulating body 2 which covers the internal conductor 1. In other words, the tubular outer sheath 3 indirectly covers the internal conductor 1 in the round cable 10.

Here, the tubular insulating body 2 and the outer sheath 3 are composed of a flame-retardant resin composition, and this flame-retardant resin composition contains a base resin composed of polyethylene and an acid-modified polyolefin, aluminum hydroxide, a silicone compound, and a fatty acid-containing compound. In this flame-retardant resin composition, the density of polyethylene is 912.4 kg/m$^3$ or less, the content rate of polyethylene in the base resin is 80% by mass or more and 99% by mass or less, and the content rate of the acid-modified polyolefin in the base resin is 1% by mass or more and 20% by mass or less. Moreover, aluminum hydroxide is blended at a proportion of 5 parts by mass or more and 190 parts by mass or less with respect to 100 parts by mass of the base resin, the silicone compound is blended at a proportion of 1.5 parts by mass or more and 10 parts by mass or less with respect to 100 parts by mass of the base resin, and the fatty acid-containing compound is blended at a proportion of 5 parts by mass or more and 20 parts by mass or less with respect to 100 parts by mass of the base resin.

The insulating body 2 and the outer sheath 3 which are composed of the above-described flame-retardant resin composition can simultaneously satisfy excellent flame retardancy, mechanical properties, weather resistance, and chemical resistance.

[Method for Producing a Cable]

Next, explanations are given for the method for producing the round cable 10 described above.

<Metal Conductor>

First, the internal conductor 1 is prepared as a metal conductor. The internal conductor 1 may consist of only a single wire or consist of a bundle of plural single wires. Furthermore, the internal conductor 1 is not particularly limited in terms of conductor diameter or conductor material, and it can be suitably determined depending on use.

<Flame Retardant Resin Composition>

On the other hand, the flame retardant resin composition is prepared. As described above, the flame retardant resin composition contains the base resin composed of polyethylene and an acid-modified polyolefin resin, aluminum hydroxide, the silicone compound and the fatty acid containing compound.

(1) Base Resin

As described above, the base resin is composed of polyethylene and an acid-modified polyolefin. In other words, the sum of the content rate of polyethylene and the content rate of acid-modified polyolefin in the base resin is 100% by mass.

The density of polyethylene is 912.4 kg/m$^3$ or less. Here, the reason why the density of polyethylene in some embodiments is set to 912.4 kg/m$^3$ or less is because the receptivity of aluminum hydroxide in polyethylene is improved and different mechanical properties and weather resistance are obtained in the flame-retardant resin composition as compared to a case in which the density is greater than 912.4 kg/m$^3$. The density of may be 905.3 kg/m$^3$ or less in some embodiments. In such embodiments, the flame-retardant resin composition may possess different mechanical properties and weather resistance as compared to embodiments in which the density of polyethylene exceeds 905.3 kg/m$^3$. However, the density of polyethylene may be 890.8 kg/m$^3$ or more in some embodiments. In such embodiments, the flame-retardant resin composition is more excellent in the wear resistance as compared to a case in which the density of polyethylene is less than 890.8 kg/m$^3$. The density of polyethylene may be 895 kg/m$^3$ or more. In such embodiments, more excellent weather resistance may be obtained in the flame-retardant resin composition as compared to a case in which the density of polyethylene is less than 895 kg/m$^3$. The density of polyethylene may still be 900 kg/m$^3$ or more.

The polyethylene may be linear polyethylene, branched polyethylene, or a mixture thereof. However, it is preferable that the polyethylene include linear polyethylene since molding is facilitated.

The polyethylene may be composed of only one kind of polyethylene or a mixture of plural kinds of polyethylenes having different densities. In a case in which the polyethylene is composed of a mixture of polyethylenes having different densities, it is acceptable that the density of the mixture is 912.4 kg/m$^3$ or less as a whole even though some polyethylenes in the mixture have a density greater than 912.4 kg/m$^3$.

The content rate of the acid-modified polyolefin in the base resin is 1% by mass or more and 20% by mass or less. In this case, the adhesive property of the polyethylene with calcium carbonate and aluminum hydroxide is further improved and more excellent chemical resistance is obtained in the flame retardant resin composition in the long term as compared to a case in which the content rate of the acid-modified polyolefin in the base resin is less than 1% by mass. In addition, the appearance of the flame-retardant resin composition after extrusion is more favorable as compared to a case in which the content rate of the acid-modified polyolefin in the base resin is greater than 20% by mass. The content rate of the acid-modified polyolefin in the base resin may be 5% by mass or more and 15% by mass or less, in some embodiments, and may be 7% by mass or more and 12% by mass or less.

The acid-modified polyolefin is one obtained by modifying a polyolefin with an acid or an acid anhydride. Examples of the polyolefin include a polyolefin containing an ethylene unit and a polyolefin containing a propylene unit. In one or more embodiments, a polyolefin may contain an ethylene unit. Examples of the polyolefin containing an ethylene unit include polyethylene; and an ethylene-α-olefin copolymer such as an ethylene-propylene copolymer. In addition, the polyolefin containing a propylene unit is a polyolefin which contains a propylene unit but does not contain an ethylene unit, and examples of such a polyolefin containing a propylene unit include polypropylene. Examples of the acid include acrylic acid and methacrylic acid, and examples of the acid anhydride include maleic anhydride and carboxylic acid anhydride. Examples of the acid-modified polyolefin include an ethylene-ethyl acrylate copolymer and a maleic anhydride-modified polyolefin. Among these, a maleic anhydride-modified polyolefin may be the acid-modified polyolefin. In this case, the flame retardant resin composition is more excellent in the mechanical properties as compared to a case in which the acid-modified polyolefin is an acid-modified polyolefin other than the maleic anhydride-modified polyolefin. In one or more embodiments, the maleic anhydride-modified polyolefin may be a maleic anhydride-modified polyethylene.

(2) Aluminum Hydroxide

Aluminum hydroxide is blended at a proportion of 5 parts by mass or more and 190 parts by mass or less with respect to 100 parts by mass of the base resin. In this case, more excellent flame retardancy is obtained in the flame retardant resin composition since spread of fire can be suppressed by the endothermic reaction of aluminum hydroxide as compared to a case in which the proportion of aluminum hydroxide blended with respect to 100 parts by mass of the base resin is less than 5 parts by mass. In addition, more excellent mechanical properties and weather resistance are obtained in the flame retardant resin composition as compared to a case in which the proportion of aluminum hydroxide blended with respect to 100 parts by mass of the base resin is greater than 190 parts by mass.

The proportion of aluminum hydroxide blended with respect to 100 parts by mass of the base resin is may be 20 parts by mass or more. In a case in which the proportion of aluminum hydroxide blended with respect to 100 parts by mass of the base resin is within the above range, more excellent flame retardancy is obtained in the flame retardant resin composition as compared to a case in which the proportion of aluminum hydroxide blended is less than 20 parts by mass. The proportion of aluminum hydroxide blended with respect to 100 parts by mass of the base resin may be 50 parts by mass or more or, in one or more embodiments, 90 parts by mass or more.

In addition, the proportion of aluminum hydroxide blended with respect to 100 parts by mass of the base resin may be 140 parts by mass or less. In this case, the flame retardant resin composition is more excellent in mechanical properties and weather resistance are more excellent as compared to a case in which the proportion of aluminum hydroxide blended with respect to 100 parts by mass of the base resin exceeds 140 parts by mass. The proportion of aluminum hydroxide blended with respect to 100 parts by mass of the base resin may be 120 parts by mass or less or 110 parts by mass or less.

(3) Silicone Compound

The silicone compound is a compound which functions as a flame retardant aid. Examples of the silicone compound include polyorganosiloxanes. Here, the polyorganosiloxanes are compounds which have siloxane bonds in the main chain and have organic groups in side chains. Examples of the organic groups include, for example, a methyl group, a vinyl group, an ethyl group, a propyl group, and a phenyl group. Specific examples of the polyorganosiloxanes include dimethyl polysiloxane, methylethyl polysiloxane, methyloctyl polysiloxane, methylvinyl polysiloxane, methylphenyl polysiloxane, and methyl-(3,3,3-trifluoropropyl)polysiloxane. The polyorganosiloxane is used in the form of silicone oil, silicone powder, silicone gum, or silicone resin. Among them, the polyorganosiloxane is may be used in the form of silicone gum. In this case, blooming is less likely to occur.

As described above, the silicone compound is blended at a proportion of 1.5 parts by mass or more and 10 parts by mass or less with respect to 100 parts by mass of the base resin. In this case, more excellent flame retardancy is obtained in the flame-retardant resin composition as compared to a case in which the proportion of the silicone compound blended with respect to 100 parts by mass of the base resin is less than 1.5 parts by mass. In addition, more excellent weather resistance is obtained as well as it is possible to more sufficiently suppress bleeding of the silicone compound in the flame-retardant resin composition since the silicone compound is more likely to be evenly mixed in the base resin and it is difficult for a lump to be partially generated as compared to a case in which the proportion of the silicone compound blended with respect to 100 parts by mass of the base resin is greater than 10 parts by mass.

The proportion of the silicone compound blended with respect to 100 parts by mass of the base resin may be 5 parts by mass or more. In this case, more excellent flame retardancy is obtained in the flame-retardant resin composition as compared to a case in which the proportion of the silicone compound blended is less than 5 parts by mass. However, the proportion of the silicone compound blended may be 7 parts by mass or less.

The silicone compound may be previously attached to the surface of aluminum hydroxide. In this case, segregation of the silicone compound is less likely to occur in the flame retardant resin composition and the uniformity of properties in the flame retardant resin composition is further improved.

Examples of a method of obtaining the silicone compound attached to the surface of aluminum hydroxide can include obtaining it by adding the silicone compound to aluminum hydroxide to obtain a mixture, drying the mixture for 10 to 40 minutes at 40 to 75° C., and pulverizing the dried mixture using a Henschel mixer, an atomizer, or the like, for example.

(4) Fatty Acid Containing Compound

The fatty acid containing compound functions as a flame retardant aid. The fatty acid containing compound indicates a compound containing a fatty acid or a metal salt thereof. Herein, as the fatty acid, a fatty acid having carbon atom number of 12 to 28 is used, for example. Examples of such a fatty acid include lauric acid, myristic acid, palmitic acid, stearic acid, tuberculostearic acid, oleic acid, linoleic acid, arachidonic acid, behenic acid, and montanic acid. In some embodiments, stearic acid or tuberculostearic acid may be the fatty acid. In this case, more excellent flame retardancy is obtained as compared to a case in which a fatty acid other than tuberculostearic acid or stearic acid is used.

In some embodiments the fatty acid containing compound may be a fatty acid metal salt. Examples of the metal constituting the fatty acid metal salt include magnesium, calcium, zinc, and lead. As the fatty acid metal salt, magnesium stearate may be used. In this case, more excellent flame retardancy is obtained with smaller addition amount in the flame retardant resin composition as compared to a case in which a fatty acid metal salt other than magnesium stearate is used.

As described above, the fatty acid-containing compound of some embodiments may be blended at a proportion of 5 parts by mass or more and 20 parts by mass or less with respect to 100 parts by mass of the base resin. In such embodiments, more excellent flame retardancy is obtained in the flame-retardant resin composition as compared to a case in which the proportion of the fatty acid-containing compound blended with respect to 100 parts by mass of the base resin is less than 5 parts by mass. In addition, more excellent weather resistance is obtained as well as it is possible to more sufficiently suppress bleeding of the fatty acid-containing compound as compared to a case in which the proportion of the fatty acid-containing compound blended with respect to 100 parts by mass of the base resin is greater than 20 parts by mass.

The proportion of the fatty acid-containing compound blended with respect to 100 parts by mass of the base resin may be 7 parts by mass or more in some embodiments. In this case, more excellent flame retardancy is obtained in the flame retardant resin composition as compared to a case in which the proportion of the fatty acid-containing compound blended with respect to 100 parts by mass of the base resin is less than 7 parts by mass. However, the proportion of the fatty acid-containing compound blended with respect to 100 parts by mass of the base resin may be 10 parts by mass or less in some embodiments.

The fatty acid-containing compound of one or more embodiments may be previously attached to the surface of aluminum hydroxide. In this case, segregation of the fatty acid-containing compound in the flame-retardant resin composition is less likely to occur and the uniformity of properties in the flame-retardant resin composition is further improved. Furthermore, the fatty acid-containing compound and the silicone compound may be previously attached to the surface of aluminum hydroxide. In this case, the segregation of the silicone compound and the fatty acid-containing compound in the flame-retardant resin composition is less likely to occur and the uniformity of properties in the flame-retardant resin composition is further improved.

Examples of a method of obtaining the silicone compound and the fatty acid-containing compound attached to the surface of aluminum hydroxide can include obtaining it by adding the silicone compound and the fatty acid-containing compound to aluminum hydroxide to obtain a mixture, drying the mixture for 10 to 40 minutes at 40 to 75° C., and pulverizing the dried mixture using a Henschel mixer, an atomizer, or the like, for example.

The flame retardant resin composition may include an anti-oxidant, a UV degradation preventing agent, a processing aid, a coloring pigment, a filler such as a lubricating agent or the like, if necessary.

The flame-retardant resin composition may be obtained by kneading a base resin composed of polyethylene and an acid-modified polyolefin, aluminum hydroxide, a silicone compound, a fatty acid-containing compound, and the like. Kneading can be conducted using a kneading machine such as a Banbury mixer, a tumbler, a pressure kneader, a kneading extruder, a twin screw extruder, or a mixing roll. At this time, a master batch (MB) obtained by kneading a part of polyethylene and the silicone compound may be kneaded with the remaining base resin, fatty acid-containing compound, aluminum hydroxide and the like from the viewpoint of improving the dispersibility of the silicone compound.

Next, the internal conductor 1 is covered with the flame retardant resin composition. Specifically, the flame retardant resin composition is melt-kneaded using an extruding machine to form a tubular extrudate. Then, the tubular extrudate is continuously coated onto the internal conductor 1. Thus, the insulating wire 4 is obtained.

<Outer Sheath>

Finally, one insulating wire 4 which has been obtained as described above is prepared, and this insulating wire 4 is covered with the outer sheath 3 as an insulating body which has been prepared using the flame retardant resin composition described above. The outer sheath 3 is a so-called sheath, and it protects the insulating body 2 from physical or chemical damages.

Thus, the round cable 10 is obtained.

[Molded Article]

One or more embodiments of the present invention is directed toward a molded article composed of the flame-retardant resin composition described above.

The molded article may simultaneously satisfy excellent flame retardancy, mechanical properties, weather resistance, and chemical resistance.

The above molded article can be obtained by a general molding method such as an injection molding method or an extrusion molding method.

The present invention is not limited to embodiments described above. For example, although the round cable 10 having one insulating wire 4 is used as a metal cable in the above embodiment, the metal cable of the present invention is not limited to the round cable, and it, for example, may be a cable which has two or more insulating wire 4 on the inner side of the outer sheath 3. A resin part consisting of polypropylene or the like may be provided between the outer sheath 3 and the insulating wire 4.

Furthermore, although the insulating body 2 and the outer sheath 3 of the insulating wire 4 is formed of the flame retardant resin composition in the above embodiment, the insulating body 2 may consist of a typical insulating resin and only the outer sheath 3 may consist of the flame retardant resin composition. Furthermore, the insulating body 2 is not necessarily required, and it can be omitted.

Figure 3:
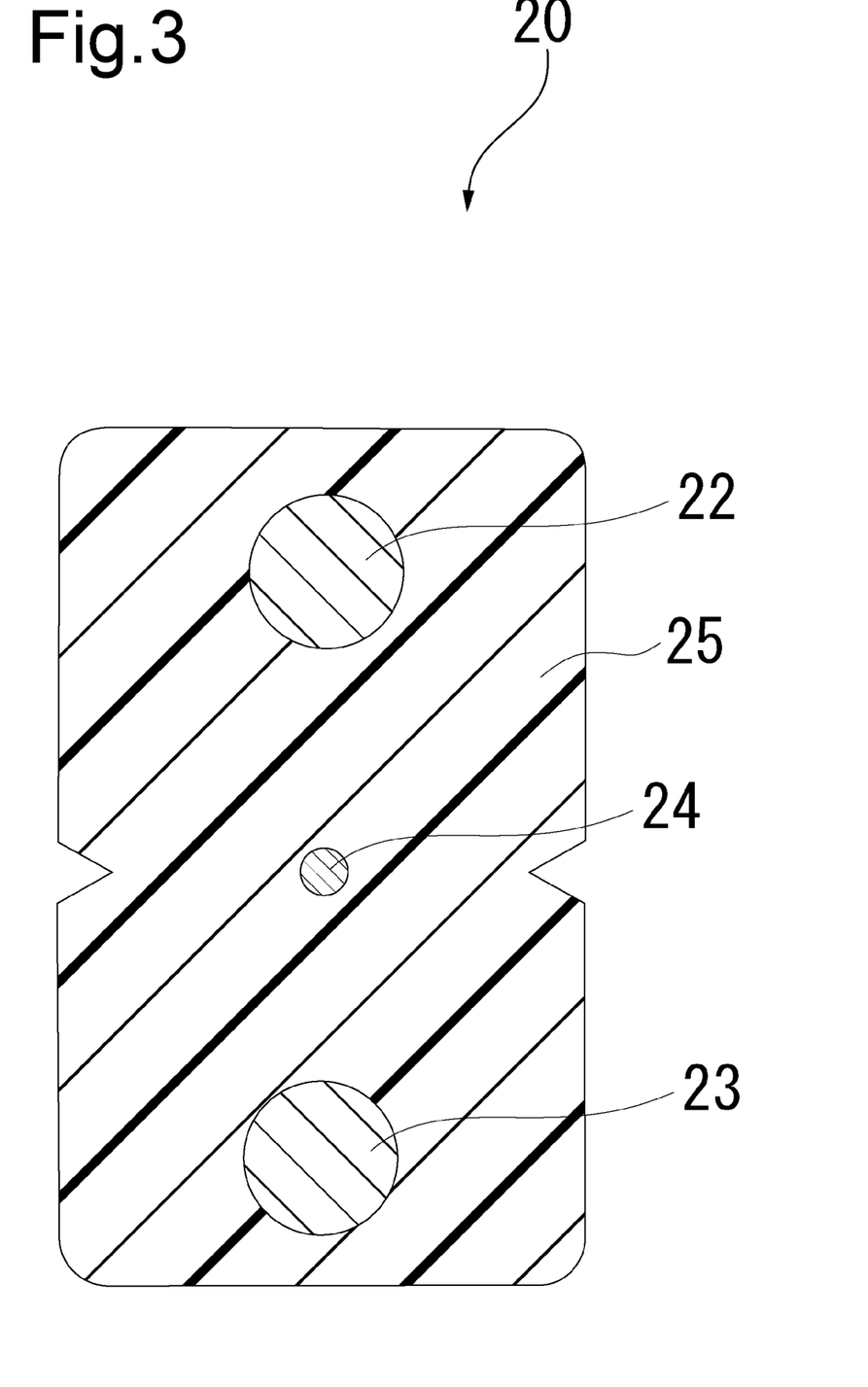
FIG. 3 is a cross-sectional view illustrating the optical fiber cable of one or more embodiments of the present invention.

Furthermore, the flame-retardant resin composition constituting the insulating body 2 and outer sheath 3 of the insulating wire 4 in the above embodiment can also be applied as an outer sheath of an optical fiber cable which is equipped with an optical fiber and an insulating body (outer sheath) covering the optical fiber. For example, FIG. 3 is a cross-sectional view illustrating an indoor type optical fiber cable of one embodiment of the present invention. As illustrated in FIG. 3, an indoor type optical fiber cable 20 is equipped with two tension members 22 and 23, an optical fiber 24, and a sheath 25 covering these. Here, the optical fiber 24 is provided so as to penetrate the sheath 25. Here, the sheath 25 is composed of the flame-retardant resin composition constituting the insulating body 2 and outer sheath 3 of the insulating wire 4 in the above embodiment.

Furthermore, the flame retardant resin composition of one or more embodiments of the present invention can be applied not only to the insulating body of the metal cable and the optical fiber cable described above but also to various uses such as a tube, a tape, wrapping material, and building material for which flame retardancy is required.

EXAMPLES

Hereinbelow, some embodiments of the present invention are more specifically explained in view of Examples and Comparative Examples. However, the present invention is not limited to the following Examples.

Examples 1 to 19 and Comparative Examples 1 to 8

Polyethylene (hereinafter referred to as the "polyethylene A"), an acid-modified polyolefin, a silicone masterbatch (silicone MB), a fatty acid-containing compound, aluminum hydroxide, an antioxidant, and an ultraviolet degradation inhibitor were blended in the amounts presented in Tables 1 to 6 and kneaded at 160° C. for 15 minutes using a Banbury mixer, thereby obtaining flame-retardant resin compositions. Here, the silicone MB is a mixture of polyethylene (hereinafter referred to as the "polyethylene B") and silicone gum. Incidentally, in Tables 1 to 6, the unit of the amount of each component blended is parts by mass. In addition, in Tables 1 to 6, the sum of the amount of polyethylene A blended and the amount of acid-modified polyolefin blended is not 100 parts by mass, but the polyethylene in the base resin is composed of a mixture of the polyethylene A and the polyethylene B in the silicone MB, and thus the sum of the amount of polyethylene A blended and the amount of polyethylene B blended in the silicone MB becomes 100 parts by mass.

<Density>

In the flame-retardant resin compositions of Examples 1 to 19 and Comparative Examples 1 to 8, the density of polyethylene in the base resin was determined by the following formula. The results are presented in Tables 1 to 6.

Density of polyethylene in base resin (kg/m$^3$)=density (kg/m$^3$) of polyethylene $A$×content rate (% by mass) of polyethylene $A$ in mixture+density (kg/m$^3$) of polyethylene $B$×content rate (% by mass) of polyethylene $B$ in mixture Specifically, the following ones were used as the polyethylene A, acid-modified polyolefin, silicone MB, fatty acid-containing compound, aluminum hydroxide, antioxidant, and ultraviolet degradation inhibitor.

(1) Polyethylene A

PE 1: Linear polyethylene: manufactured by Ube-Maruzen Polyethylene Co, Ltd., density: 904 kg/m$^3$ PE 2: Linear polyethylene: manufactured by Prime Polymer Co., Ltd., density: 890 kg/m$^3$ PE 3: Linear polyethylene: manufactured by Sumitomo Chemical Co., Ltd., density: 912 kg/m$^3$ PE 4: Linear polyethylene: manufactured by Sumitomo Chemical Co., Ltd., density: 920 kg/m$^3$ (2) Acid-Modified Polyolefin Maleic anhydride-modified polyethylene: manufactured by Mitsui Chemicals, Inc.

Maleic anhydride-modified polypropylene: manufactured by Mitsui Chemicals, Inc.

Ethylene-ethyl acrylate copolymer: manufactured by Japan Polyethylene Corporation Ethylene-vinyl acetate copolymer: manufactured by DU PONT-MITSUI POLYCHEMICALS CO., LTD.

(3) Silicone MB: manufactured by Shin-Etsu Chemical Co., Ltd. (containing silicone gum at 50% by mass and polyethylene B (density: 915 kg/m$^3$) at 50% by mass)

(4) Aluminum hydroxide: manufactured by Nippon Light Metal Co., Ltd.

(5) Fatty Acid-Containing Compound

Magnesium stearate: manufactured by ADEKA CORPORATION

Zinc stearate: manufactured by NOF CORPORATION

Calcium stearate: manufactured by SAKAI CHEMICAL INDUSTRY CO., LTD.

Stearic acid: manufactured by NOF CORPORATION

Behenic acid: manufactured by NOF CORPORATION

Montanic acid: manufactured by Clariant (Japan) K.K.

(6) Antioxidant

Hindered phenol-based antioxidant: manufactured by BASF SE (7) Ultraviolet Degradation Inhibitor Hindered amine-based light stabilizer: manufactured by SUNCHEMICAL CO., LTD.

[Evaluation on Properties]

The flame retardancy, mechanical properties, weather resistance, and chemical resistance of the flame-retardant resin compositions of Examples 1 to 19 and Comparative Examples 1 to 8 obtained as described above were evaluated.

Incidentally, the flame retardancy was evaluated for optical fiber cables which were fabricated as follows using the flame-retardant resin compositions of Examples 1 to 19 and Comparative Examples 1 to 8.

(Fabrication of Optical Fibers Cable for Flame Retardancy Evaluation)

The flame-retardant resin compositions of Examples 1 to 19 and Comparative Examples 1 to 8 were charged into a single-screw extruder (25 mm φ extruder, manufactured by Marth Seiki CO., LTD.) and kneaded, and tubular extrudates were extruded from the extruder and coated on one coated optical fiber so as to have a short diameter of 1.8 mm and a long diameter of 2.6 mm. Optical fiber cables were thus fabricated.

<Flame Retardancy>

For ten of the optical fiber cables obtained as described above, a vertical combustion test for a single cable based on IEC 60332-1 was carried out. Thereafter, the proportion of self-extinguished optical fiber cables among the ten optical fiber cables was calculated as the pass rate (unit: %) based on the following formula, and this pass rate was taken as the evaluation index for flame retardancy.

Pass rate (%)=100×number of self-extinguished optical fiber cables/total number of tested optical fiber cables (10)

The results are presented in Tables 1 to 6. Incidentally, in Tables 1 to 6, the combustion time was also described. Here, the average value of combustion times of ten optical fiber cables was taken as the combustion time. In addition, the pass criteria for flame retardancy were set as follows.

(Pass Criteria) Pass rate is 100%

<Mechanical Properties>

Mechanical properties were evaluated for No. 3 dumbbell test pieces based on JIS K6251 which were fabricated using the flame-retardant resin compositions of Examples 1 to 19 and Comparative Examples 1 to 8. Specifically, five of the No. 3 dumbbell test pieces were prepared, a tensile test was conducted according to JIS C3005 for these five No. 3 dumbbell test pieces, and the fracture strength and elongation percentage thus measured were taken as the index for mechanical properties. The results are presented in Tables 1 to 6. Incidentally, the pass criteria for tensile strength and elongation percentage were set as follows. In addition, the tensile test was conducted under the conditions of a tensile speed of 200 mm/min and a gauge length of 20 mm.

(Pass Criteria) Tensile strength is 10 MPa or more and elongation percentage is 500% or more <Weather Resistance>

Weather resistance was evaluated for No. 3 dumbbell test pieces which were the same as the No. 3 dumbbell test piece used in the evaluation on mechanical properties and were fabricated using the flame-retardant resin compositions of Examples 1 to 19 and Comparative Examples 1 to 8. Specifically, five of the No. 3 dumbbell test pieces were prepared first, and an accelerated weathering (S-UV) test was conducted for these five No. 3 dumbbell test pieces. At this time, the S-UV test was conducted using a metal halide lamp type weatherometer, and the testing conditions were as follows.

(Testing Conditions)
Black panel temperature: 63° C.
Irradiation intensity: 0.53 kW/h
Irradiation wavelength: 300 to 400 nm
Irradiation time: 100 hours Thereafter, a tensile test was conducted for the five dumbbell test pieces after the S-UV test in the same manner as the tensile test conducted in the evaluation on mechanical properties, and the tensile fracture strength and tensile elongation were thus measured. At this time, the average values of tensile fracture strength and tensile elongation of the five dumbbell test pieces were taken as values of tensile fracture strength and tensile elongation, respectively. Subsequently, the ratio (retention) of the tensile fracture strength after the S-UV test to the tensile fracture strength before the S-UV test was calculated as the retention of strength. In addition, the ratio (retention) of the tensile elongation after the S-UV test to the tensile elongation before the S-UV test was calculated as the retention of elongation. Moreover, the retention of strength and the retention of elongation were taken as an index of weather resistance. The results are presented in Tables 1 to 6. Incidentally, the pass criteria for weather resistance were set as follows.

(Pass Criteria) Retention of strength is 75% or more and retention of elongation is 60% or more <Chemical Resistance>

Chemical resistance was evaluated for sheets which have dimensions of 13 mm×40 mm×3 mm (thickness) and were fabricated using the flame-retardant resin compositions of Examples 1 to 19 and Comparative Examples 1 to 8. Specifically, ten of the above sheets were prepared first, and an environmental stress crack resistance test based on ASTM D1693 was conducted for these ten sheets. Specifically, a 10% by mass aqueous solution of a surfactant (trade name "ANTAROK CO-650" manufactured by DSP GOKYO FOOD & CHEMICAL Co., Ltd.) was prepared and adjusted to 50° C., and the sheets were immersed in this aqueous solution and left to stand for 50 days. Thereafter, the presence or absence of cracks in the sheets after the test was visually observed. The chemical resistance was then evaluated based on the presence or absence of cracks in these sheets. The results are presented in Tables 1 to 6. The pass criteria for chemical resistance were set as follows.

(Pass Criteria) Cracks are not observed in all ten sheets

Incidentally, in Tables 1 to 6, "◯" is denoted in the case of pass and "X" is denoted in the case of failure, namely, in a case in which cracks are observed in some of ten sheets.

TABLE 1

| | | | Example 1 | Example 2 | Example 3 | Example 4 | Example 5 |
|---|---|---|---|---|---|---|---|
| Composition | Polyethylene A | PE1 (Density: 904 kg/m$^3$) | 85 | | | 75 | 94 |
| | | PE2 (Density: 890 kg/m$^3$) | | 85 | | | |
| | | PE3 (Density: 912 kg/m$^3$) | | | 85 | | |
| | | PE4 (Density: 920 kg/m$^3$) | | | | | |

TABLE 1-continued

|  |  |  | Example 1 | Example 2 | Example 3 | Example 4 | Example 5 |
|---|---|---|---|---|---|---|---|
| Acid-modified polyolefin | Acid-modified polyethylene |  | 10 | 10 | 10 | 20 | 1 |
| Silicone MB | Polyethylene B/silicone gum |  | 5/5 | 5/5 | 5/5 | 5/5 | 5/5 |
| Aluminum hydroxide |  |  | 100 | 100 | 100 | 100 | 100 |
| Fatty acid-containing compound | Magnesium stearate |  | 7 | 7 | 7 | 7 | 7 |
| Antioxidant | Hindered phenol-based antioxidant |  | 0.2 | 0.2 | 0.2 | 0.2 | 0.2 |
| Ultraviolet degradation inhibitor | Hindered amine-based light stabilizer |  | 0.8 | 0.8 | 0.8 | 0.8 | 0.8 |
| Density of polyethylene (unit: kg/m³) |  |  | 904.6 | 891.4 | 912.2 | 904.7 | 904.6 |
| Properties | Mechanical properties | Fracture strength (MPa) | 16.9 | 16.0 | 14.3 | 16.8 | 16.7 |
|  |  | Elongation percentage (%) | 640 | 690 | 600 | 650 | 680 |
|  | Flame retardancy | Vertical combustion test for single cable — Pass rate (%) | 100 | 100 | 100 | 100 | 100 |
|  |  | Combustion time (s) | 29 | 27 | 36 | 27 | 31 |
|  | Weather resistance | S-UV test (after 100 h) — Retention of strength (%) | 81 | 80 | 75 | 83 | 83 |
|  |  | Retention of elongation (%) | 95 | 88 | 61 | 96 | 88 |
|  | Chemical resistance | Environmental stress crack resistance test — Presence or absence of cracks | ○ | ○ | ○ | ○ | ○ |

TABLE 2

|  |  |  | Example 6 | Example 7 | Example 8 | Example 9 | Example 10 | Example 11 |
|---|---|---|---|---|---|---|---|---|
| Composition | Polyethylene A | LDPE1 (Density: 904 kg/m³) | 85 | 85 | 88.5 | 80 | 85 | 85 |
|  |  | LDPE2 (Density: 890 kg/m³) |  |  |  |  |  |  |
|  |  | LDPE3 (Density: 912 kg/m³) |  |  |  |  |  |  |
|  |  | LDPE4 (Density: 920 kg/m³) |  |  |  |  |  |  |
|  | Acid-modified polyolefin | Acid-modified polyethylene | 10 | 10 | 10 | 10 | 10 | 10 |
|  | Silicone MB | Low density polyethylene B/silicone gum | 5/5 | 5/5 | 1.5/1.5 | 10/10 | 5/5 | 5/5 |
|  | Aluminum hydroxide |  | 5 | 190 | 100 | 100 | 100 | 100 |
|  | Fatty acid-containing compound | Magnesium stearate | 7 | 7 | 7 | 7 | 5 | 20 |
|  | Antioxidant | Hindered phenol-based antioxidant | 0.2 | 0.2 | 0.2 | 0.2 | 0.2 | 0.2 |
|  | Ultraviolet degradation inhibitor | Hindered amine-based light stabilizer | 0.8 | 0.8 | 0.8 | 0.8 | 0.8 | 0.8 |
| Density of low density polyethylene (unit: kg/m³) |  |  | 904.6 | 904.6 | 904.2 | 905.2 | 904.6 | 904.6 |
| Properties | Mechanical properties | Fracture strength (MPa) | 26.9 | 10.3 | 17.2 | 15.8 | 16.5 | 16.1 |
|  |  | Elongation percentage (%) | 780 | 555 | 650 | 620 | 630 | 620 |
|  | Flame retardancy | Vertical combustion test for single cable — Pass rate (%) | 100 | 100 | 100 | 100 | 100 | 100 |
|  |  | Combustion time (s) | 33 | 31 | 65 | 10 | 63 | 13 |
|  | Weather resistance | S-UV test (after 100 h) — Retention of strength (%) | 89 | 75 | 87 | 77 | 86 | 75 |
|  |  | Retention of elongation (%) | 97 | 64 | 96 | 85 | 96 | 78 |
|  | Chemical resistance | Environmental stress crack resistance test — Presence or absence of cracks | ○ | ○ | ○ | ○ | ○ | ○ |

TABLE 3

|  |  |  | Example 12 | Example 13 | Example 14 |
|---|---|---|---|---|---|
| Composition | Polyethylene A | PE1 (Density: 904 kg/m³) | 85 | 85 | 85 |
|  |  | PE2 (Density: 890 kg/m³) |  |  |  |
|  |  | PE3 (Density: 912 kg/m³) |  |  |  |
|  |  | PE4 (Density: 920 kg/m³) |  |  |  |
|  | Acid-modified polyolefin | Acid-modified polyethylene |  |  |  |
|  |  | Acid-modified polypropylene | 10 |  |  |
|  |  | Ethylene-ethyl acrylate copolymer |  | 10 |  |
|  |  | Ethylene-vinyl acetate copolymer |  |  | 10 |
|  | Silicone MB | Polyethylene B/silicone gum | 5/5 | 5/5 | 5/5 |
|  | Aluminum hydroxide |  | 100 | 100 | 100 |

TABLE 3-continued

|  |  |  | Example 12 | Example 13 | Example 14 |
|---|---|---|---|---|---|
| Fatty acid-containing compound | Magnesium stearate | | 7 | 7 | 7 |
| Antioxidant | Hindered phenol-based antioxidant | | 0.2 | 0.2 | 0.2 |
| Ultraviolet degradation inhibitor | Hindered amine-based light stabilizer | | 0.8 | 0.8 | 0.8 |
| Density of polyethylene (unit: kg/m$^3$) | | | 904.6 | 904.6 | 904.6 |
| Properties | Mechanical properties | Fracture strength (MPa) | 12.2 | 13.6 | 12.9 |
| | | Elongation percentage (%) | 580 | 615 | 610 |
| | Flame retardancy | Vertical combustion test for single cable — Pass rate (%) | 100 | 100 | 100 |
| | | Combustion time (s) | 30 | 37 | 34 |
| | Weather resistance | S-UV test (after 100 h) — Retention of strength (%) | 77 | 84 | 88 |
| | | Retention of elongation (%) | 86 | 97 | 95 |
| | Chemical resistance | Environmental stress crack resistance test — Presence or absence of cracks | ○ | ○ | ○ |

TABLE 4

|  |  |  | Example 15 | Example 16 | Example 17 | Example 18 | Example 19 |
|---|---|---|---|---|---|---|---|
| Composition | Polyethylene A | PE1 (Density: 904 kg/m$^3$) | 85 | 85 | 85 | 85 | 85 |
| | Acid-modified polyolefin | Acid-modified polyethylene | 10 | 10 | 10 | 10 | 10 |
| | Silicone MB | Polyethylene B/silicone gum | 5/5 | 5/5 | 5/5 | 5/5 | 5/5 |
| | Aluminum hydroxide | | 100 | 100 | 100 | 100 | 100 |
| | Fatty acid-containing compound | Magnesium stearate | | | | | |
| | | Zinc stearate | 7 | | | | |
| | | Calcium stearate | | 7 | | | |
| | | Stearic acid | | | 7 | | |
| | | Behenic acid | | | | 7 | |
| | | Montanic acid | | | | | 7 |
| | Antioxidant | Hindered phenol-based antioxidant | 0.2 | 0.2 | 0.2 | 0.2 | 0.2 |
| | Ultraviolet degradation inhibitor | Hindered amine-based light stabilizer | 0.8 | 0.8 | 0.8 | 0.8 | 0.8 |
| Density of polyethylene (unit: kg/m$^3$) | | | 904.6 | 904.6 | 904.6 | 904.6 | 904.6 |
| Properties | Mechanical properties | Fracture strength (MPa) | 16.4 | 17 | 16.7 | 16.5 | 17.2 |
| | | Elongation percentage (%) | 625 | 645 | 655 | 645 | 640 |
| | Flame retardancy | Vertical combustion test for single cable — Pass rate (%) | 100 | 100 | 100 | 100 | 100 |
| | | Combustion time (s) | 35 | 45 | 42 | 43 | 44 |
| | Weather resistance | S-UV test (after 100 h) — Retention of strength (%) | 79 | 79 | 82 | 81 | 83 |
| | | Retention of elongation (%) | 93 | 92 | 93 | 92 | 93 |
| | Chemical resistance | Environmental stress crack resistance test — Presence or absence of cracks | ○ | ○ | ○ | ○ | ○ |

TABLE 5

|  |  |  | Comparative Example 1 | Comparative Example 2 | Comparative Example 3 | Comparative Example 4 |
|---|---|---|---|---|---|---|
| Composition | Polyethylene A | PE1 (Density: 904 kg/m$^3$) | | 95 | 85 | 85 |
| | | PE2 (Density: 890 kg/m$^3$) | | | | |
| | | PE3 (Density: 912 kg/m$^3$) | | | | |
| | | PE4 (Density: 920 kg/m$^3$) | 85 | | | |
| | Acid-modified polyolefin | Acid-modified polyethylene | 10 | 0 | 10 | 10 |
| | Silicone MB | Polyethylene B/silicone gum | 5/5 | 5/5 | 5/5 | 5/5 |
| | Aluminum hydroxide | | 100 | 100 | 3 | 200 |
| | Fatty acid-containing compound | Magnesium stearate | 7 | 7 | 7 | 7 |
| | Antioxidant | Hindered phenol-based antioxidant | 0.2 | 0.2 | 0.2 | 0.2 |

TABLE 5-continued

|  |  |  | Comparative Example 1 | Comparative Example 2 | Comparative Example 3 | Comparative Example 4 |
|---|---|---|---|---|---|---|
|  | Ultraviolet degradation inhibitor | Hindered amine-based light stabilizer | 0.8 | 0.8 | 0.8 | 0.8 |
| Density of polyethylene (unit: kg/m$^3$) |  |  | 919.7 | 904.6 | 904.6 | 904.6 |
| Properties | Mechanical properties | Fracture strength (MPa) | 13.0 | 16.9 | 27.0 | 9.8 |
|  |  | Elongation percentage (%) | 550 | 680 | 790 | 535 |
|  | Flame retardancy | Vertical combustion test for single cable Pass rate (%) | 100 | 100 | 0 | 100 |
|  |  | Combustion time (s) | 55 | 32 | Completely burned down | 26 |
|  | Weather resistance | S-UV test (after 100 h) Retention of strength (%) | 64 | 84 | 94 | 70 |
|  |  | Retention of elongation (%) | 56 | 96 | 98 | 53 |
|  | Chemical resistance | Environmental stress crack resistance test Presence or absence of cracks | ○ | X | ○ | ○ |

TABLE 6

|  |  |  | Comparative Example 5 | Comparative Example 6 | Comparative Example 7 | Comparative Example 8 |
|---|---|---|---|---|---|---|
| Composition | Polyethylene A | PE1 (Density: 904 kg/m$^3$) | 89 | 79 | 85 | 85 |
|  |  | PE2 (Density: 890 kg/m$^3$) |  |  |  |  |
|  |  | PE3 (Density: 912 kg/m$^3$) |  |  |  |  |
|  |  | PE4 (Density: 920 kg/m$^3$) |  |  |  |  |
|  | Acid-modified polyolefin | Acid-modified polyethylene | 10 | 10 | 10 | 10 |
|  | Silicone MB | Polyethylene B/silicone gum | 1/1 | 11/11 | 5/5 | 5/5 |
|  | Aluminum hydroxide |  | 100 | 100 | 100 | 100 |
|  | Fatty acid-containing compound | Magnesium stearate | 7 | 7 | 4 | 21 |
|  | Antioxidant | Hindered phenol-based antioxidant | 0.2 | 0.2 | 0.2 | 0.2 |
|  | Ultraviolet degradation inhibitor | Hindered amine-based light stabilizer | 0.8 | 0.8 | 0.8 | 0.8 |
| Density of polyethylene (unit: kg/m$^3$) |  |  | 904.1 | 905.3 | 904.6 | 904.6 |
| Properties | Mechanical properties | Fracture strength (MPa) | 17.2 | 15.7 | 17.9 | 15.7 |
|  |  | Elongation percentage (%) | 650 | 620 | 660 | 620 |
|  | Flame retardancy | Vertical combustion test for single cable Pass rate (%) | 0 | 100 | 0 | 100 |
|  |  | Combustion time (s) | Completely burned down | 20 | Completely burned down | 27 |
|  | Weather resistance | S-UV test (after 100 h) Retention of strength (%) | 88 | 73 | 89 | 74 |
|  |  | Retention of elongation (%) | 97 | 82 | 99 | 70 |
|  | Chemical resistance | Environmental stress crack resistance test Presence or absence of cracks | ○ | ○ | ○ | ○ |

From the results presented in Tables 1 to 6, the flame-retardant resin compositions of Examples 1 to 19 satisfied the pass criteria for flame retardancy, mechanical properties, weather resistance, and chemical resistance. In contrast, the flame-retardant resin compositions of Comparative Examples 1 to 8 did not satisfy the pass criteria for at least one of flame retardancy, mechanical properties, weather resistance, or chemical resistance.

From this fact, it was confirmed that the flame-retardant resin composition of one or more embodiments of the present invention may simultaneously satisfy excellent flame retardancy, mechanical properties, weather resistance, and chemical resistance.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

EXPLANATIONS OF LETTERS OR NUMERALS

1 Internal conductor (metal conductor)
2 Insulating body

3 Outer sheath (insulating body)
4 Insulating wire
10 Round cable (metal cable)
20 Indoor type optical fiber cable
24 Optical fiber
25 Outer Sheath (insulating body)

The invention claimed is:

1. A flame-retardant resin composition comprising:
a base resin composed of polyethylene and an acid-modified polyolefin;
aluminum hydroxide;
a silicone compound; and
a fatty acid-containing compound, wherein
the polyethylene has a density of 912.4 kg/m$^3$ or less,
the polyethylene is present in the base resin in an amount of the range 80 to 99% by mass,
the acid-modified polyolefin is present in the base resin in an amount of the range 1 to 20% by mass,
the aluminum hydroxide is blended in a proportion of the range 5 to 190 parts by mass with respect to 100 parts by mass of the base resin,
the silicone compound is blended in a proportion of the range 1.5 to 10 parts by mass with respect to 100 parts by mass of the base resin, and
the fatty acid-containing compound is blended in a proportion of the range 5 to 20 parts by mass with respect to 100 parts by mass of the base resin.

2. The flame-retardant resin composition of claim 1, wherein the density of the polyethylene is 905.3 kg/m$^3$ or less.

3. The flame-retardant resin composition of claim 1, wherein the acid-modified polyolefin is a maleic anhydride-modified polyolefin.

4. The flame-retardant resin composition of claim 1, wherein the aluminum hydroxide is blended to the base resin at a proportion of the range 5 to 140 parts by mass, with respect to 100 parts by mass of the base resin.

5. The flame-retardant resin composition of claim 1, wherein the silicone compound is silicone gum.

6. The flame-retardant resin composition of claim 1, wherein the fatty acid-containing compound is magnesium stearate.

7. The flame-retardant resin composition of claim 1, wherein the fatty acid-containing compound is blended to the base resin in an amount of the range 7 to 20 parts by mass, with respect to 100 parts by mass of the base resin.

8. The flame-retardant resin composition of claim 1, wherein the base resin consists of the polyethylene and the acid-modified polyolefin.

9. The flame-retardant resin composition of claim 1, wherein the density of the polyethylene is from 904 to 912.4 kg/m$^3$.

10. The flame-retardant resin composition of claim 1, wherein the silicone compound is blended to the base resin at a proportion of the range of 5 to 10 parts by mass, with respect to 100 parts by mass of the base resin.

11. A metal cable comprising:
a metal conductor; and
an insulating body covering the metal conductor, wherein the insulating body is composed of the flame-retardant resin composition of claim 1.

12. An optical fiber cable comprising:
an optical fiber; and
an insulating body covering the optical fiber, wherein the insulating body is composed of the flame-retardant resin composition of claim 1.

13. A molded article comprising the flame-retardant resin composition of claim 1.

* * * * *